(12) United States Patent
Okuyama et al.

(10) Patent No.: US 8,274,462 B2
(45) Date of Patent: Sep. 25, 2012

(54) ELECTRO-OPTICAL DEVICE, METHOD OF DRIVING THE SAME, AND ELECTRONIC APPARATUS

(75) Inventors: Tomoyuki Okuyama, Chino (JP); Tetsuro Matsumoto, Chino (JP)

(73) Assignee: Seiko Epson Corporation, Tokyo (JP)

( * ) Notice: Subject to any disclaimer, the term of this patent is extended or adjusted under 35 U.S.C. 154(b) by 433 days.

(21) Appl. No.: 12/542,033

(22) Filed: Aug. 17, 2009

(65) Prior Publication Data

US 2010/0039441 A1 Feb. 18, 2010

(30) Foreign Application Priority Data

Aug. 18, 2008 (JP) ................................. 2008-209510

(51) Int. Cl.
*G09G 3/36* (2006.01)
(52) U.S. Cl. ............. 345/89; 345/96; 345/101; 345/212
(58) Field of Classification Search ............ 345/87–101, 345/204–215, 690
See application file for complete search history.

(56) References Cited

U.S. PATENT DOCUMENTS

| | | | | |
|---|---|---|---|---|
| 7,598,931 B2* | 10/2009 | Han | .................. | 345/60 |
| 7,737,933 B2* | 6/2010 | Yamano et al. | ................. | 345/94 |
| 7,760,158 B2* | 7/2010 | Yoon et al. | ........................ | 345/60 |
| 7,864,152 B2* | 1/2011 | Park et al. | .......................... | 345/98 |
| 8,072,407 B2* | 12/2011 | Tanaka et al. | .................... | 345/94 |
| 2001/0038371 A1* | 11/2001 | Yoshinaga et al. | ............... | 345/87 |
| 2004/0066363 A1* | 4/2004 | Yamano et al. | ................. | 345/98 |
| 2005/0128167 A1* | 6/2005 | Yoon et al. | ........................ | 345/60 |
| 2006/0066515 A1* | 3/2006 | Han | ................. | 345/60 |
| 2007/0120799 A1* | 5/2007 | Tanaka et al. | .................... | 345/98 |
| 2007/0152945 A1* | 7/2007 | Park et al. | ........................ | 345/98 |

FOREIGN PATENT DOCUMENTS

JP  P4023517 B2  10/2007

* cited by examiner

*Primary Examiner* — Vijay Shankar
(74) *Attorney, Agent, or Firm* — Maschoff Gilmore & Israelsen

(57) ABSTRACT

An electro-optical device includes a pixel that has an electro-optical element with a light transmittance that changes to a predetermined value in response to an applied voltage, which changes in response to the temperature. A light source irradiates light to the pixel. A driving unit includes a predetermined number of sub-fields having the same length in one frame. The driving unit provides either an on-voltage indicating light-on or an off-voltage indicating light-off to the pixel in each of the predetermined number of the sub-fields in response to the grayscale to be displayed. A temperature measuring unit measures the temperature and outputs a temperature signal. A time controlling unit controls the length of one sub-field on the basis of the temperature signal. A light intensity controlling unit controls the intensity of the light incident on the pixel on the basis of the temperature signal.

7 Claims, 10 Drawing Sheets

FIG. 3
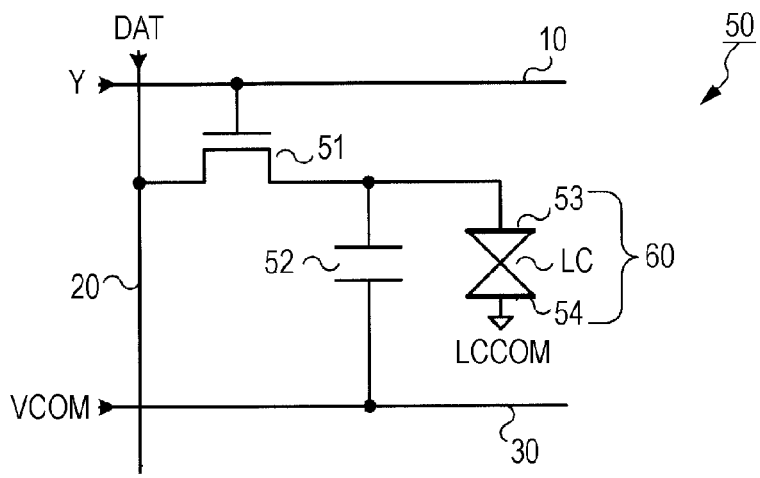
FIG. 4
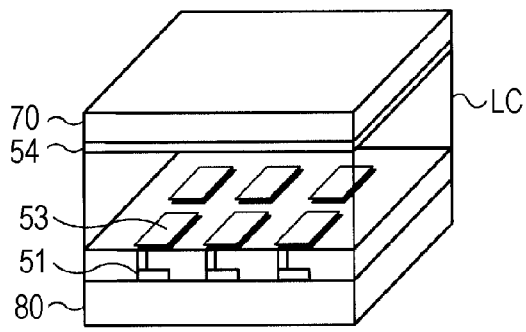
FIG. 5
| GRAYSCALE LEVEL | SF1 | SF2 | SF3 | | SF80 |
|---|---|---|---|---|---|
| q – 1 | 0 | 0 | 0 | | 0 |
| q – 2 | 0 | 0 | 1 | | 0 |
| q – 3 | 0 | 0 | 1 | | 0 |
| | | | | | |
| 0 | 0 | 0 | 1 | | 1 |
1: ON-VOLTAGE
0: OFF-VOLTAGE

ELECTRO-OPTICAL DEVICE, METHOD OF DRIVING THE SAME, AND ELECTRONIC APPARATUS

BACKGROUND

1. Technical Field

The present invention relates to an electro-optical device using an electro-optical material such as a liquid crystal, a method of driving the same, and an electronic apparatus.

2. Related Art

A liquid crystal is known as an electro-optical material that has optical characteristics that are changed by electrical energy. The liquid crystal has transmittance that changes in response to an applied voltage. Liquid crystal devices using the change in transmittance are known. Liquid crystal devices include a plurality of scan lines, a plurality of data lines, and a plurality of pixels provided to correspond to intersections of the scan lines and the data lines. The plurality of pixels has a pixel electrode, an opposite electrode, and a liquid crystal element composed of the liquid crystal which is interposed therebetween.

As a method of digitally driving liquid crystal devices, there is known a sub-field driving method that divides one field into a plurality of sub-fields along a time axis, and in each sub-field, applies an on-voltage or an off-voltage to each pixel in accordance to a gray scale. This method is of changing the effective voltage which offers the voltage to be applied to the liquid crystal is performed not by the voltage level but by the application time of a voltage pulse, to control transmittance of a liquid crystal panel. In the method, the voltage level necessary to drive the liquid crystal is only two values, an on-level and an off-level. In a simple sub-field driving method, the grayscales that are able to be displayed are limited by the number of divided sub-fields.

However, at a constant temperature, the response characteristics of the liquid crystal are such that they have a response speed which quickens in response to the magnitude of electrical field applied to the liquid crystal layer in the transition from a steady state (oriented state). The transition from a state where the electrical field is applied to the liquid crystal layer to the oriented state requires a certain amount of response time. This response time is typically several times longer than the time for which the electrical field is applied to the liquid crystal layer.

Japanese Patent No. 4,023,517 discloses technology that can display a number of grayscales which is the same as or greater than the number of sub-fields by using the rise time and fall time of the liquid crystal.

However, the response time of the liquid crystal changes to a great extent due to the temperature. For this reason, even though a grayscale corresponding to a value of digital data can be accurately minced at a certain temperature, the grayscale that has to be displayed becomes inaccurate if the temperature changes. In some instances, even when the value of digital data becomes large, the reversion of a grayscale may arise where the displayed grayscale becomes dark.

SUMMARY

An advantage of some aspects of the invention is to provide an electro-optical device and an electronic apparatus capable of preventing the reversion of the grayscales while displaying a number of grayscales equal to or greater than the number of sub-fields.

According to a first aspect of the invention, there is provided an electro-optical device, including: a pixel that has an electro-optical element of which light transmittance changes in response to an applied voltage, and response time, for which the light transmittance changes to a predetermined value after the voltage is applied, changes in response to temperature; a light source that irradiates light to the pixel; a driving unit that includes a predetermined number of sub-fields having the same length in one frame, and that provides either an on-voltage indicating light-on or an off-voltage indicating light-off to the pixel in each of the predetermined number of sub-fields in response to the grayscale to be displayed; a temperature measuring unit that measures the temperature and outputs a temperature signal; a time controlling unit that controls the length of one sub-field on the basis of the temperature signal; and a light intensity controlling unit that controls the intensity of the light incident on the pixel on the basis of the temperature signal.

According to this invention, the length of one sub-field is adjusted and the intensity of the light incident on the pixel is controlled even if the response time of the electro-optical element changes in response to the temperature. This thereby makes it possible to keep the display luminance constant even if the temperature changes. Specifically, if the response time becomes longer in response to the temperature, it is possible to make the temporal alteration in the transmittance (for example, the response waveform of the case where the transmittance of the liquid crystal is taken on the longitudinal axis, and the time is taken on the transverse axis) constant by making shorter the length of one sub-field even if the temperature changes. In other words, it is preferable to control the length of one sub-field so that the temporal alteration in the transmittance is constant even if there is a change in the temperature. The sub-field is one unit that can control the lighting and/or the turning off of a pixel. However, if the length of the sub-field changes, the length of the residual period changes during which it is not possible to control the lighting and/or the turning off, which can be compensated by controlling the intensity of the light incident on the pixel. As a result, it is possible to prevent a reversion of the grayscale while displaying a number of grayscales equal to or greater than the number of sub-fields.

In addition, a typical example of the electro-optical element is a liquid crystal element. Further, the response time for which the light transmittance changes to a predetermined value after the voltage is applied is, for example, the time for which it takes the transmittance to change from 10% to 90%.

It is preferable that the time controlling unit controls the length of the one sub-field on the basis of the temperature signal so that the ratio of the response time to the length of the one sub-field is constant even if the temperature changes. In this case, it is possible to make the temporal alteration in the transmittance constant even if the temperature changes.

Moreover, it is preferable that when a residual period is defined as the period in which the predetermined number of the sub-fields are removed from one frame, the light intensity controlling unit controls the intensity of the light incident on the pixel on the basis of the temperature signal in compensation for the length of the residual period that has changed due to the temperature so that the grayscale to be displayed is constant. In this case, the length of the residual period can be compensated for in the case where the change in transmittance is made constant by the time controlling unit, whereby the grayscale to be displayed can be made constant.

Moreover, if the response time becomes longer, the length of the sub-field is controlled to be shorter. However, in this case, the intensity of the light incident on the pixel is controlled to be larger since the residual period becomes longer. If so, the temperature rises, and the response time becomes shorter. Consequently, by the carrying out of a feedback control, the length of the sub-field and the intensity of the light incident on the pixel will converge respectively to certain values. Therefore, it is possible to perform a stable control.

Moreover, it is preferable that the light source controls the intensity of the light irradiated on the basis of a control signal, and that the light intensity controlling unit provides the control signal generated on the basis of the temperature signal to the light source. In this case, the intensity of the irradiated light of the light source is directly adjusted, thereby making it possible to simplify the configuration.

Moreover, it is preferable that the light intensity controlling unit includes an adjusting unit that is disposed between the light source and the pixel and that adjusts the intensity of the light irradiated by the light source in response to the magnitude of the control signal and output it to the pixel, and a controlling unit that controls the magnitude of the control signal provided to the adjusting unit on the basis of the temperature signal. In this case, it is possible to make the amount of light from the light source constant. Herein, the adjusting unit may be a mechanical aperture that changes in response to the magnitude of the control signal, or an electro-optical panel that can control the transmittance in response to the magnitude of the control signal.

Next, according to a second aspect of the invention, an electronic apparatus including an electro-optical device is provided. Such an electronic apparatus includes a projector, a personal computer, a display and the like.

Next, according to a third aspect of the invention, there is provided a method of driving an electro-optical device including a pixel that has an electro-optical element of which light transmittance changes in response to an applied voltage, and response time, for which the light transmittance changes to a predetermined value after the voltage is applied, changes in response to the temperature. The method includes: including a predetermined number of sub-fields having the same length in one frame, and supplying either an on-voltage indicating light-on or an off-voltage indicating light-off to the pixel in each of the predetermined number of the sub-fields in response to the grayscale to be displayed; controlling the length of one sub-field so that the ratio of the response time to the length of the one sub-field is constant in response to the temperature of the pixel; and controlling, when a residual period is defined as a period in which the predetermined number of the sub-fields are removed from the one frame, the intensity of the light incident on the pixel in compensation for the length of the residual period that changes due to the temperature of the pixel so that the grayscale to be displayed is constant.

According to this invention, the length of one sub-field is adjusted and the intensity of the light incident on the pixel is controlled even if the response time of the electro-optical element changes in response to the temperature, thereby making it possible to keep the display luminance constant even if the temperature changes. Specifically, if the response time becomes longer in response to the temperature, it is possible to make the temporal alteration in the transmittance constant by making shorter the length of one sub-field even if the temperature changes. The sub-field is one unit that can control the lighting and/or the turning off of the pixel. However, if the length of the sub-field is changed, the length of the residual period changes during which it is not possible to control the lighting and/or the turning off, which can be compensated for by controlling the intensity of the light incident on the pixel. Specifically, the length of one sub-field is adjusted so that the temporal alteration in the transmittance is constant even if the temperature changes. The disadvantages that may occur due to this adjustment are resolved by adjusting the intensity of the light incident on the pixel. By performing a two-step adjustment in this way, it is possible to prevent a reversion of the grayscale while displaying a number of grayscales equal to or greater than the number of sub-fields.

BRIEF DESCRIPTION OF THE DRAWINGS

The invention will be described with reference to the accompanying drawings, wherein like numbers reference like elements.

FIG. 3 is an electrical configuration diagram of a pixel of the liquid crystal display.

FIG. 4 is a schematic view showing a portion of the structure of an image display region A of the liquid crystal display 1.

FIG. 5 is a schematic view showing the contents of a conversion table of the liquid crystal display.

DESCRIPTION OF EXEMPLARY EMBODIMENTS

1. Embodiments

A liquid crystal display 1 according to an embodiment of the invention includes a crystal display panel as a main portion. The crystal display panel is constituted in such a manner that the electrode forming surfaces of an element substrate and an opposite substrate, on which a thin film transistor (hereinafter, referred to as "TFT") are formed as a switching element, face each other, and are adhered so that a uniform gap is maintained, with liquid crystals being interposed in the gap.

Figure 1:
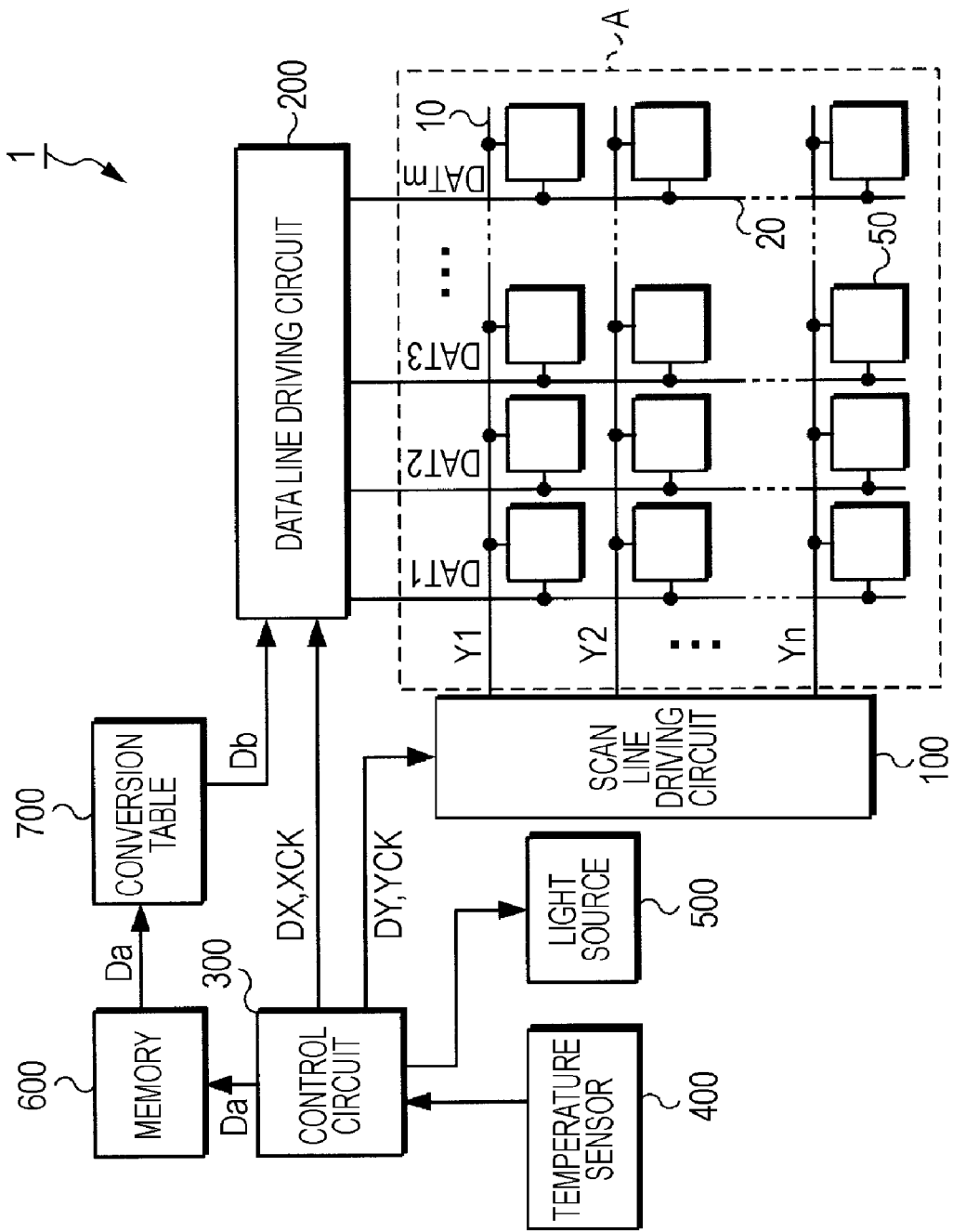
FIG. 1 is a block diagram showing the entire configuration of a liquid crystal display according to an embodiment of the invention.

FIG. 1 is a block diagram showing the entire configuration of the liquid crystal display 1. The liquid crystal display 1 includes a scan line driving circuit 100, a data line driving circuit 200, a control circuit 300, a temperature sensor 400, a light source 500, a memory 600, a conversion table 700, and an image display region A. Among these constituents, the liquid crystal panel includes at least the image display region A. The light source 500 is constituted as external circuitry of the liquid crystal panel. The scan line driving circuit 100, the data line driving circuit 200, the control circuit 300, the temperature sensor 400, the memory 600, and a conversion table 700 may be incorporated into the liquid crystal panel or may be constituted as external circuitry. In this embodiment, the image display region A, the scan line driving circuit 100, and the data line driving circuit 200 are formed on the element substrate of the liquid crystal panel.

On the image display region A, n scan lines 10, m data lines 20, and pixels 50 of n columns×m rows corresponding to the intersection of the scan lines 10 and the data lines 20 are formed. n and m are both natural numbers not less than 2. The light from the light source 500 is incident on the pixels 50. As described later, the pixels 50 have liquid crystal elements, and the liquid crystal display 1 performs the grayscale display through light modulation by adjusting the light transmittance of the pixels 50.

The control circuit 300 receives display data Da designating the grayscale level (grayscale: brightness) of each pixel 50 from a higher-level device (not shown) to write it into the memory 600, generates X transfer initiation pulse DX and X clock signal XCK and supplies them to the data line driving circuit 200, and generates Y transfer initiation pulse DY and Y clock signal YCK and supplies them to the scan line driving circuit 100.

Figure 2:
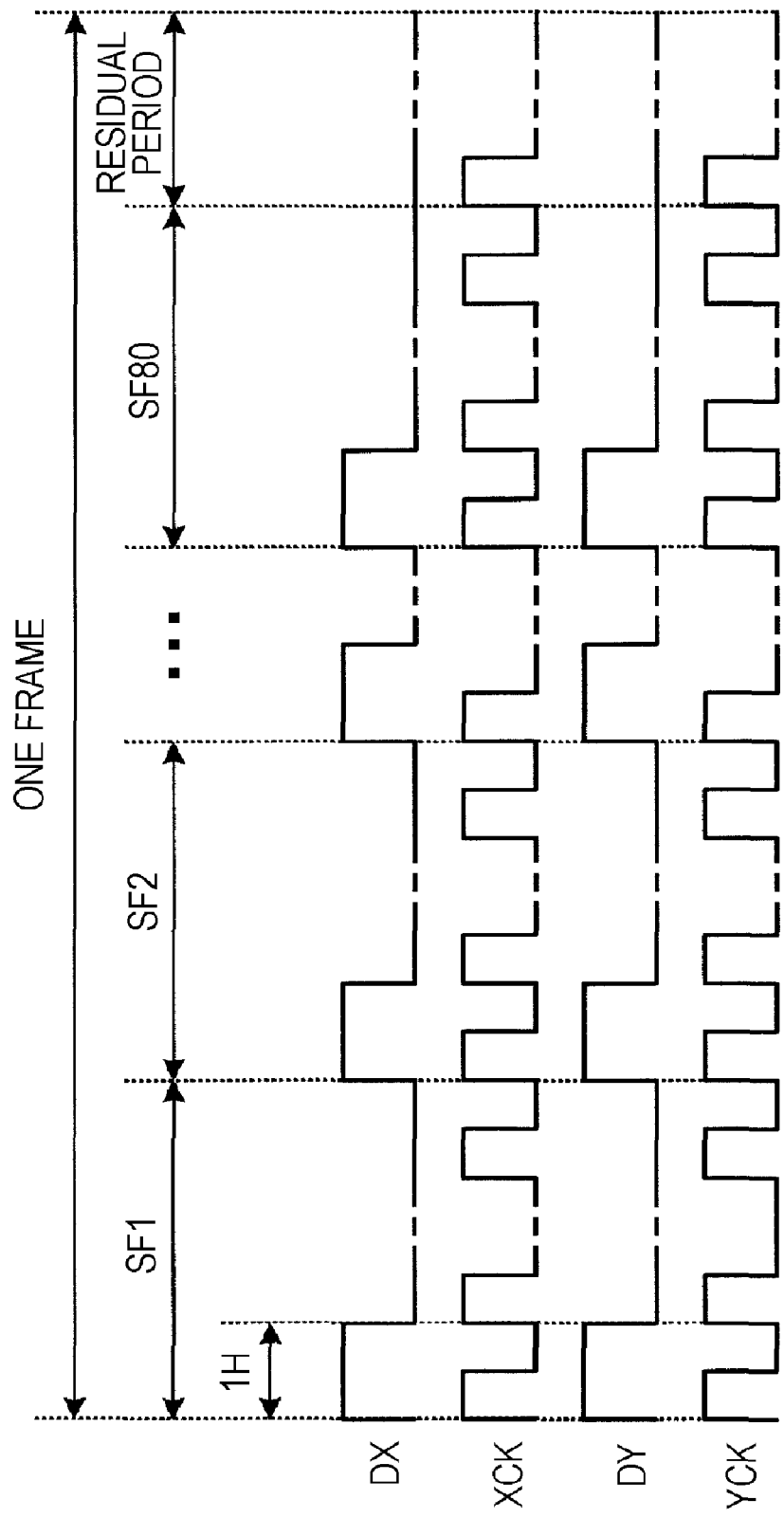
FIG. 2 shows various types of timing charts for the signals which are output from a control circuit of the liquid crystal display.

FIG. 2 shows various types of timing charts for the signals which are output from the control circuit 300. In this embodiment, a portion or whole of one frame is divided into eighty sub-fields SF1 to SF80 as shown in FIG. 2. When a portion of one frame is divided into eighty sub-fields SF1 to SF80, the remaining period is referred to as a "residual period". One frame represents the period necessary to form a piece of image (for example, 16.6 ms) and is synonymous with one frame. Moreover, the lengths of the sub-fields SF1 to SF80 are equal to each other.

Each sub-field is divided into n horizontal scan periods (1H). The X transfer initiation pulse DX and the Y clock signal YCK each are at an active level at initial 1H in each sub-field, and are at an non-active level at other periods. The X clock signal XCK and the Y clock signal YCK are each pulse signals of which the periods are set to 1H. In addition, this embodiment may be modified so that the number of sub-fields included in one frame is set to the arbitrary plural number other than 80.

The scan line driving circuit 100 performs scanning of n×m pixels 50 for each sub-field. In particular, the scan line driving circuit 100 has a shift register which sequentially shifts the Y initiation pulse DY in accordance with the Y clock signal YCK, and in each sub-field, generates scan signals Y1 to Yn which sequentially and exclusively select n scan lines 10 and supplies them to the n scan lines 10, respectively, by the shift of Y initiation pulse DY. Accordingly, the scan signals Y1 to Yn are at the active level during the sub-field period, and each scan line 10 is selected at 1H during which the supplied scan lines Y are at the active level.

FIG. 3 is an electrical configuration diagram of the pixel 50, and FIG. 4 is a schematic view showing a portion of structure of the image display region A. As shown in FIG. 3 and FIG. 4, the pixel 50 includes a liquid crystal element 60, a selection transistor 51 disposed between a data line 20 and the liquid crystal element 60, and a retention capacitor 52. The selection transistor 51 is formed on an element substrate 80, and a pixel electrode 53 is formed thereon. On the other hand, an opposite electrode 54 is formed all over the lower surface of an opposite substrate 70. The pixel electrode 53 and the opposite electrode 54 are disposed so as to face each other via a predetermined gap with liquid crystals LCs filled therebetween.

In such a configuration, when the scan signal Y supplied through the scan line 10 is at an active level, the selection transistor 51 is in an on-state, and a data potential DAT is written into the pixel 50 (retention capacitor 52). And then, when the scan signal Y is at a non-active level, the selection transistor 51 is in an off-state, and the written data potential DAT is retained in retention capacitor 52. The retention capacitor 52 is disposed between the pixel electrode 53 and a retention capacitor line 30. The actual selection transistor 51 does not have a complete off-state, but generates a constant leak current. However, it is possible to reduce the effect of the leak current and improve the retention characteristics of the data potential DAT by disposing the retention capacitor 52.

In this embodiment, the liquid crystal 60 is set to a normally white mode. Therefore, the light transmittance of the liquid crystal element 60 becomes lower as the effective value of the difference voltage between the pixel electrode 53 and the opposite electrode 54 becomes larger, and the grayscale of the pixel 50 becomes nearly a black color in a state where no voltage is applied. However, in this embodiment, only either an on-voltage (for example, 5V) making the difference voltage be equal to or more than the saturated voltage, or an off-voltage (for example, 0V) making it be equal to or less than the threshold voltage, is applied to the pixel electrode 53. Further, it is possible to obtain the same configuration as this embodiment even in the case when using liquid crystal elements set to a normally black mode.

When the light transmittance in the darkest condition is set to 0% of the relative light transmittance, and the light transmittance in the brightest condition is set to 100% of the relative light transmittance in the normally white mode, among the voltages applied to the liquid crystal element 60, the voltage where the relative light transmittance is 10% is referred to as the optical threshold voltage, and the voltage where the relative light transmittance is 90% is referred to as the optical saturated voltage. A voltage modulation method (analog driving), when making the liquid crystal element 60 become halftone (gray) is designed so that a voltage equal to or less than the optical saturated voltage is applied to the liquid crystals LCs. Therefore, the light transmittance of the liquid crystals LCs has a value nearly proportional to the applied voltage of the liquid crystals LCs.

In regard to this, the grayscale display is performed in this embodiment by using only two voltages applied to the liquid crystal element 60, the on-voltage and off-voltage. In particular, this embodiment is constituted so that a portion or the whole of one frame is divided into eighty sub-fields, a configuration where the on- or off-voltage is applied to the liquid crystal element 60 is adopted in each sub-field, and the grayscale display is performed by controlling the temporal placement between the sub-field to which the on-voltage is applied and the sub-field to which the off-voltage is applied with respect to each liquid crystal element 60.

While a retention capacitor line potential VCOM is supplied from a power supply circuit (not shown) to the retention capacitor line 30, an opposite electrode potential LCCOM is supplied from the power supply circuit to the opposite electrode 54. Although the retention capacitor line potential VCOM and the opposite electrode potential LCCOM do not necessarily have to be identical to each other, both potentials are made to be identical for the purpose of simplifying the configuration of the power supply circuit in this embodiment.

The memory 600 has storage regions corresponding to the n×m pixels 50, and each of storage regions stores display data Da related to the corresponding pixels 50. Display data Da are for designating the brightness (grayscale level) of the pixel 50, and are designated by q stages from 0 to q−1 in this embodiment. q is a natural number not less than 2. Herein, the grayscale level of "0" designates black at the lowest grayscale, and the brightness slowly increases as the grayscale level is higher so that the grayscale level of "q−1" designates white at the highest grayscale.

When the scan line 10 is selected by the scan line driving circuit 100, the control circuit 300 reads display data Da of m pixels 50 corresponding to the selected scan line 10 from the memory 600 and supplies it to the conversion table 700. Further, the control circuit 300 has a ring counter representing the present sub-field. Counter values of the ring counter increase by 1 at the point where the Y initiation pulse DY is at an active level, and are set to return to 1 after reaching 80.

FIG. 5 is a schematic view showing the contents of the conversion table 700. As showed in FIG. 5, the conversion table 700 designates the voltage (on-voltage or off-voltage) applied to the liquid crystal element 60 in the sub-field so as to achieve the grayscale level (brightness) for each q grayscale level capable of being designated by display data Da and for each sub-field. Further, the conversion table 700 converts display data Da which are read from the memory 600 into data Db designating the voltage corresponding to the grayscale level designated by the display data Da and the present sub-field.

FIG. 5 is a view showing the case of q>4. The on-voltage is represented as "1", and the off-voltage is represented as "0" in this figure. The conversion table 700 designates that the on-voltage is applied at the sub-field SF1 and SF2 and the off-voltage is applied at the sub-field SF3 to SF80, for example, with respect to the liquid crystal element 60 in the pixel 50 in which the grayscale level is set to "0". Further, permutations of the voltages corresponding to the sub-field SF1 to SF80 are different for each grayscale level.

The data line driving circuit 200 of FIG. 1 converts the converted m data Db respectively into the m data potentials DAT1 to DATm using the conversion table 700, and supplies the converted data potentials DAT1 to DATm respectively to m data lines 20 for each 1H in accordance with the X transfer initiation pulse DX and the X clock signal XCK. As shown in FIG. 3, when the opposite electrode potential LCCOM is applied to the opposite electrode 54, and then the data potential DAT is applied to the pixel electrode 53, the difference voltage between the data potential DAT and the opposite electrode potential LCCOM is applied to the liquid crystal element 60. The data potential DAT is a potential in response to the corresponding data Db, and is determined so that the difference voltage and the voltage (on-voltage or off-voltage) designated by the data Db are identical to each other.

As is obvious from the above-mentioned description, the control circuit 300 supplies the Y transfer initiation pulse DY and the Y clock signal YCK to the scan line driving circuit 100, the scan line driving circuit 100 generates the scan signals Y1 to Yn in accordance to these signals, and supplies them to the corresponding scan lines 10. By doing this, the n scan lines 10 are sequentially and exclusively selected in 1H unit.

Further, the control circuit 300, prior to selecting the first line of the scan lines 10, reads the display data Da of m pixels 50 corresponding to the scan lines 10 from the memory 600 and supplies them to the conversion table 700. The conversion table 700 converts each of the m display data Da readings into data Db corresponding to the grayscale level designated by the display data Da and the first sub-field. The data line driving circuit 200 stores up the m (1 line) data Db converted by the conversion table 700, and then when the scan signal Y1 is at an active level, it supplies the data potentials DAT1 to DATm in response to the voltage (on-voltage or off-voltage) designated by the m data Db respectively to the m data lines 20. In this way, the data potentials DAT1 to DATm are written into the first m pixels 50, each of the light transmittances of these pixels 50 depend on the data potentials DATs written into the pixels 50, and the grayscales of the pixels 50 ideally have the grayscales designated by the display data Da. Such a process of one line is repeatedly performed in 1H units.

When finishing the process of one line with respect to the last line, the sub-field SF1 is finished and the sub-field SF2 is started. The same process as the above is performed in the sub-field SF2 as well. Such a process is repeatedly performed until the sub-field SF80 is finished.

Figure 6:
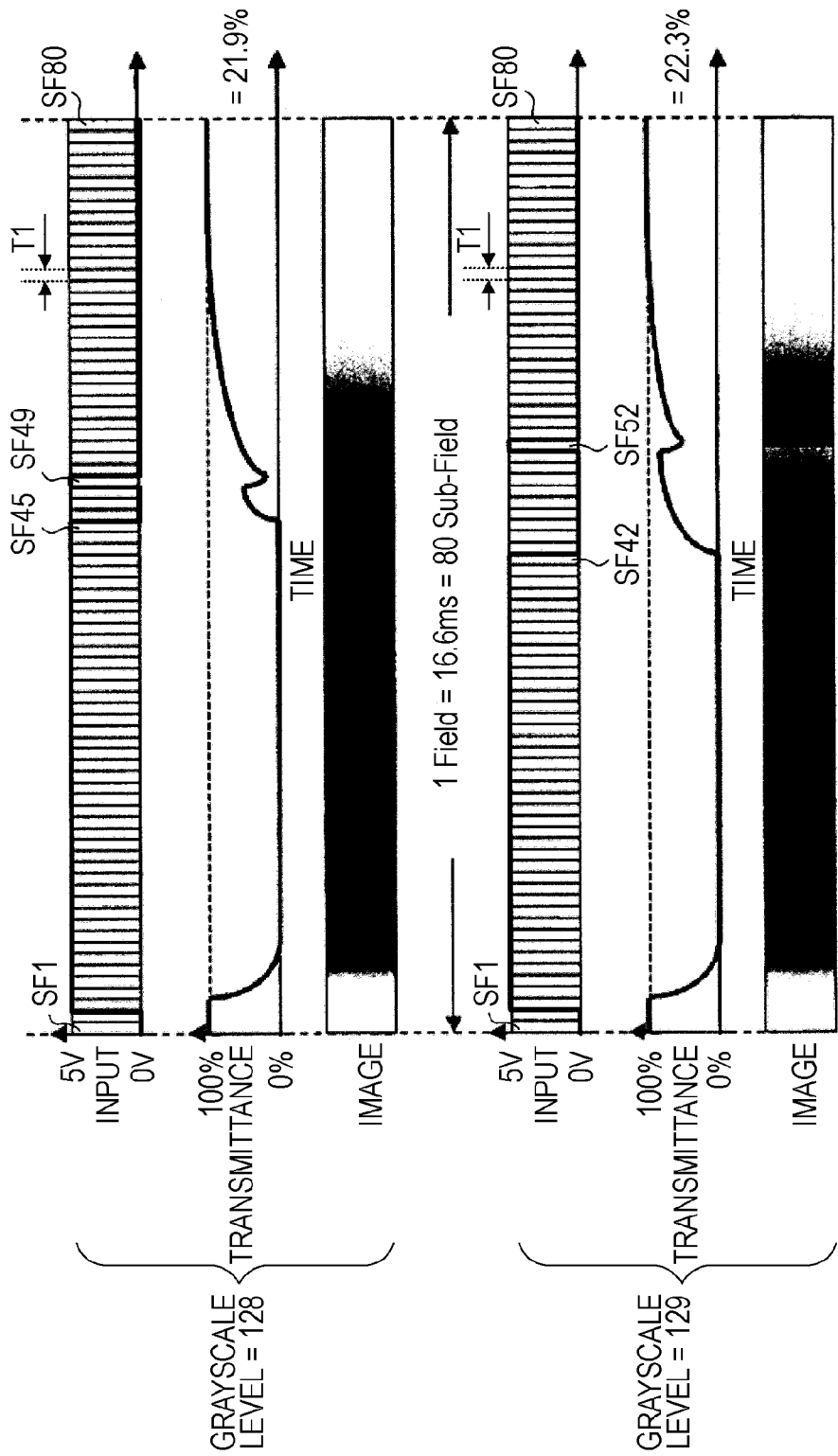
FIG. 6 is a view illustrating the response images of a liquid crystal element with respect to the input signals (applied voltages) to the liquid crystal element in the pixel.

FIG. 6 is a view illustrating the response images of the liquid crystal element 60 with respect to the input signals (applied voltages) to the liquid crystal element 60. This illustration represents the case where the whole of one frame is divided into eighty sub-fields SF1 to SF80, and the length (T1) of the sub-field in this illustration is 16.6/80 ms. The upper side of the drawing shows the response image in the case where 128 is designated as the grayscale level, and the lower side of the drawing shows the response image in the case where 129, which is brighter than 128, is designated as the grayscale level. Further, this illustration assumes that q=256.

At the upper side of the drawing, since the voltage of the input signal is maintained at 0V in the period of the sub-fields SF1 to SF2, the light transmittance of the liquid crystal LC reaches 100%, and the grayscale of the pixel 50 is equivalent to the highest grayscale as shown by the image. Since the voltage of the input signal is maintained at 5V in the period of the sub-fields SF3 to SF49, the light transmittance of the liquid crystal LC is maintained by lowering it from 100% to 0%, and the grayscale of the pixel 50 is maintained by lowering it from the highest grayscale to the lowest grayscale. Since the voltage of the input signal is maintained at 0V in the period of the sub-fields SF46 to SF48, the light transmittance of the liquid crystal LC increases from 0%, and the grayscale of the pixel 50 increases from the lowest grayscale. Since the voltage of the input signal is maintained at 5V in the period of the sub-field SF49, the light transmittance of the liquid crystal LC falls, and the grayscale of the pixel 50 falls. Since the voltage of the input signal is maintained at 0V in the period of the sub-fields SF50 to SF80, the light transmittance of the liquid crystal LC is maintained by increasing to 100%, and the grayscale of the pixel 50 is maintained by increasing to the highest grayscale. As a result, the integrated value (mean value) of the light transmittance over one frame is 21.9%.

At the lower side of the drawing, since the voltage of the input signal is maintained at 0V in the period of the sub-fields SF1 to SF2, the light transmittance of the liquid crystal LC reaches 100%, and the grayscale of the pixel 50 is equivalent to the highest grayscale. Since the voltage of the input signal is maintained at 5V in the period of the sub-fields SF3 to SF42, the light transmittance of the liquid crystal LC is maintained by falling from 100% to 0%, and the grayscale of the pixel 50 is maintained by falling from the highest grayscale to the lowest grayscale. Since the voltage of the input signal is maintained at 0V in the period of the sub-fields SF43 to SF51, the light transmittance of the liquid crystal LC increases from 0%, and the grayscale of the pixel 50 increases from the lowest grayscale. Since the voltage of the input signal is maintained at 5V in the period of the sub-field SF52, the light transmittance of the liquid crystal LC falls, and the grayscale of the pixel 50 falls. Since the voltage of the input signal is maintained at 0V in the period of the sub-fields SF53 to SF80, the light transmittance of the liquid crystal LC is maintained by increasing to 100%, and the grayscale of the pixel 50 is maintained by increasing to the highest grayscale. As a result, the integrated value (mean value) of the light transmittance over one frame is 22.3%, the grayscale (129) of the pixel 50 over one frame is higher than the grayscale (128) in the case of the upper side of the drawing.

Figure 7:
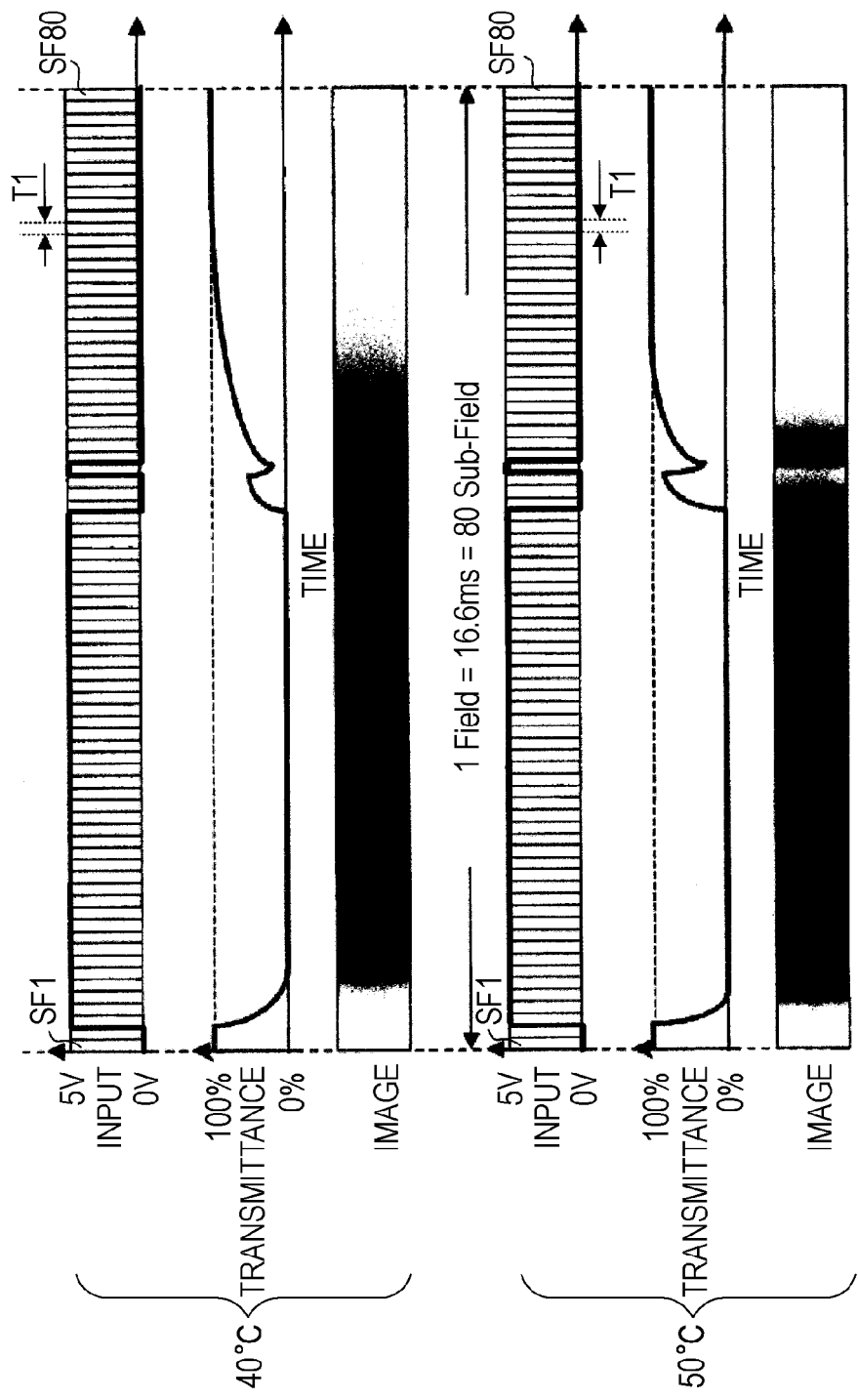
FIG. 7 is a view illustrating the response images in a case where the applied voltages change in the same manner.

In this embodiment, the grayscale display is performed in this way. However, in practice, the grayscale to be displayed is different in response to the temperature of the liquid crystal LC as shown in FIG. 7. At the upper side and the lower side of the drawing, the identical grayscale levels are designated with respect to the identical pixels 50, and response images are shown for the case where the voltages of the input signals change in the same manner. The response image at the upper side corresponds to the case where the temperature of the liquid crystal LC is 40° C., and the response image at the lower side corresponds to the case where the temperature of the liquid crystal LC is 50° C. As is obvious from comparing to both sides, in spite that the identical grayscale level is designated, the identical pixel 50 becomes dark in the case of the upper side, and becomes bright in the case of the lower side. This difference is attributed to the change in viscosity, that is, the response characteristics of the liquid crystal LC in accordance to the temperature.

Figure 8:
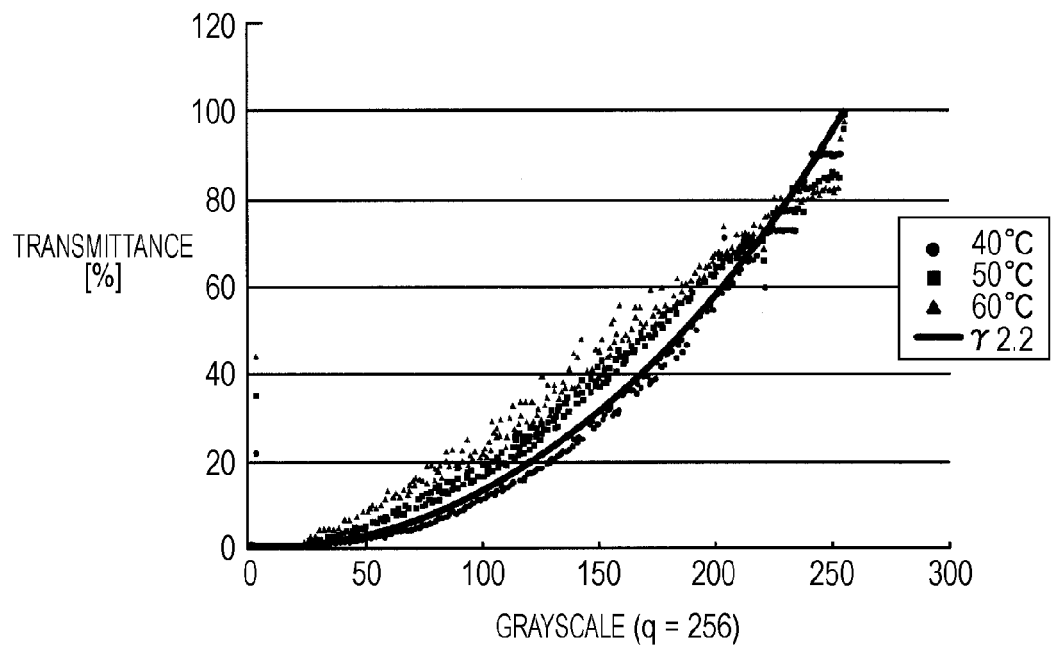
FIG. 8 is a graph showing the relationship between the change in temperature and the deviation in the grayscales of a liquid crystal LC of the liquid crystal element.

FIG. 8 is a graph showing the relationship between the change in temperature and the deviation in grayscale of the liquid crystal LC. This graph is obtained using the display data Da which make γ equal to 2.2 when the temperature of the liquid crystal LC is 40° C. In this regard, the grayscale level is 256 (q=256). It has been found that, from this graph, the deviation in grayscale becomes large as the temperature of the liquid crystal LC rises, and that a reversion of the grayscale occurs due to the change in temperature of the liquid crystal LC. This reversion of the grayscale has particularly occurred in large numbers when the grayscale is low. One of the aims of this embodiment is to prevent the grayscale from reversing.

Figure 9:
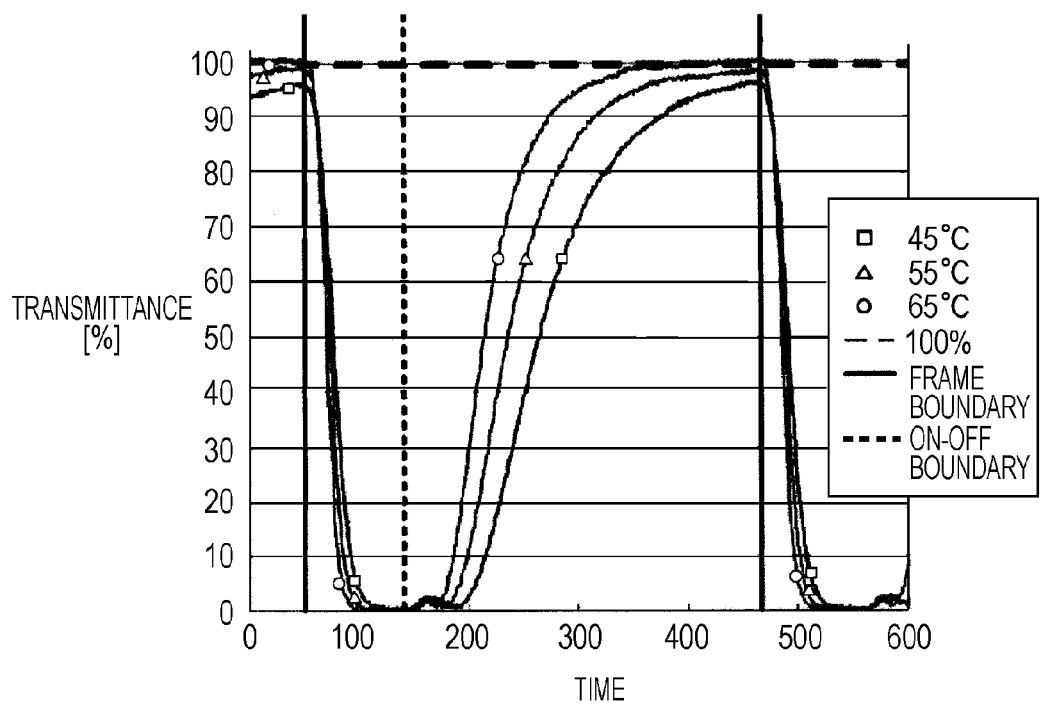
FIG. 9 is a view showing the temperature dependence of the response characteristics of the liquid crystal LC.

FIG. 9 is a view showing temperature dependence of the response characteristics of the liquid crystal LC. As shown in FIG. 9, even when the timing (on-off boundary) of the change from the on-voltage to the off-voltage is in accord with each other within one frame when the voltage applied to the liquid crystal element 60 including the liquid crystal LC with the light transmittance of 0%, the time (on-off time) from the on-off boundary to the point in time when the light transmittance reaches a value of 90% due to the temperature of the liquid crystal LC varies to a great extent depending on the temperature of the liquid crystal LC. Consequently, in this embodiment, the reversion of the grayscale is prevented by making the ratio of on-off time to the temperatures equal to the ratio of the length of the sub-field between the temperatures.

The process of making both of the ratios equal to each other is performed by the control circuit 300 and the temperature sensor 400. The temperature sensor 400 is disposed within or in proximity to the liquid crystal panel, and measures the temperature of the liquid crystal panel. The control circuit 300 adjusts the length of the sub-field on the basis of the temperature measured by the temperature sensor 400. The control circuit 300 generates the X transfer initiation pulse DX, the X clock signal XCK, the Y transfer initiation pulse DY, and Y clock signal YCK in accordance to the length after adjusting, and reads display data Da from the memory 600 at the timing in accordance to the length after adjusting. Of course, in adjusting the length of the sub-field, the total length of all of the lengths of the eighty sub-fields does not exceed one frame.

Figure 10:
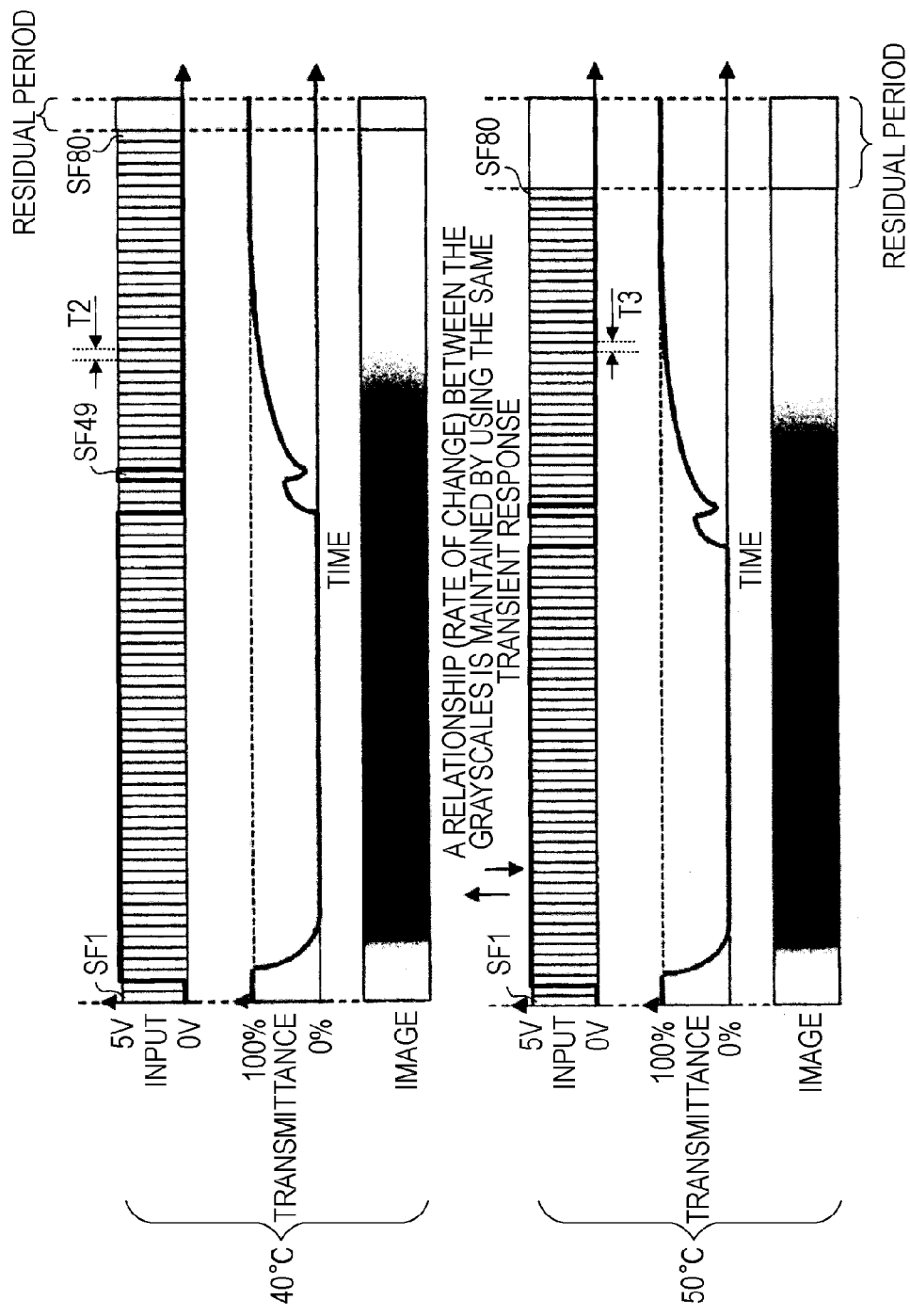
FIG. 10 is a view illustrating the response images of the liquid crystal element with respect to the applied voltages.

FIG. 10 is a view illustrating the response images of the liquid crystal element 60 with respect to the input signals (applied voltages) to the liquid crystal element 60. In this illustration, a portion of one frame is divided into eighty fields by adjusting the length of the sub-field, and the remaining period is referred to as a residual period. The response image at the upper side of the drawing corresponds to the case where the temperature of the liquid crystal panel is 40° C., and the response image at the lower side corresponds to the case where the temperature of the liquid crystal panel is 50° C. As shown in FIG. 10, when the length of the sub-field of the upper side is T2, and the length of the sub-field of the lower side is T3, the relation is T2>T3. Since the ratio of T2 and T3 is equal to the ratio of on-off time at 40° C. and on-off time at 50° C., it is possible to equally set the temporal placements, in eighty sub-fields, of the sub-fields where the on-voltage is applied and the sub-fields where the off-voltage is applied to liquid crystal element 60 at the upper side and the lower side, that is, to display the grayscales by using the same transient response at the upper side and the lower side. Therefore, according to this embodiment, it is possible to maintain the relationship (rate of change in brightness between the grayscales) between the grayscales. In the end, according to this embodiment, it is possible to prevent the grayscale from reversing.

However, in this embodiment, the brightness of the pixel 50 increases due to the residual period. As shown in FIG. 10, the residual period becomes longer at 60° C. and becomes shorter at 40° C., as compared to the case where the temperature of the liquid crystal LC is 50° C. Consequently, in this embodiment, the emission intensity of the light source 500 is adjusted in response to the temperature of the liquid crystal LC, so that the grayscale change in the pixel 50 due to the adjusting of the length of the sub-field is suppressed.

Figure 11:
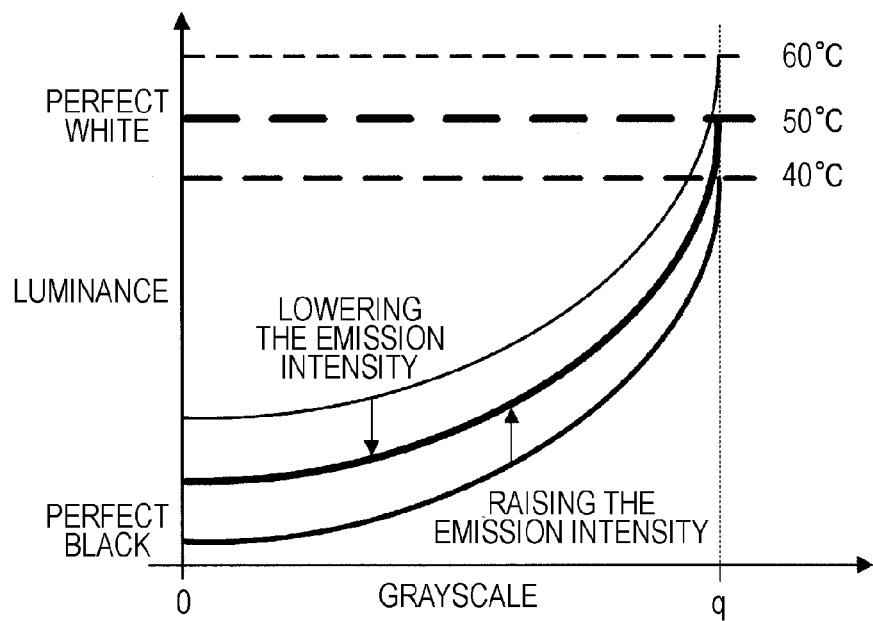
FIG. 11 is a view showing the contents of adjustments of the emission intensity of a light source in the liquid crystal display.

A process of adjusting the emission intensity of the light source 500 in response to the temperature of the liquid crystal LC is performed by the control circuit 300, the temperature sensor 400 and the light source 500. The light source 500 is a light source capable of adjusting the emission intensity, and the control circuit 300 adjusts the emission intensity of the light source 500 on the basis of the temperature measured by the temperature sensor 400. In such an adjustment, when the temperature measured by the temperature sensor 400 is lower than 50° C., the control circuit 300 raises the emission intensity of the light source 500 by an amount corresponding to the difference between this temperature and 50° C., as shown in FIG. 11. When the temperature is higher than 50° C., the control circuit 300 lowers the emission intensity of the light source 500 by an amount corresponding to the difference between this temperature and 50° C. By doing this, the grayscale change in the pixel 50 due to the adjusting of the length of the sub-field is suppressed.

Figure 12:
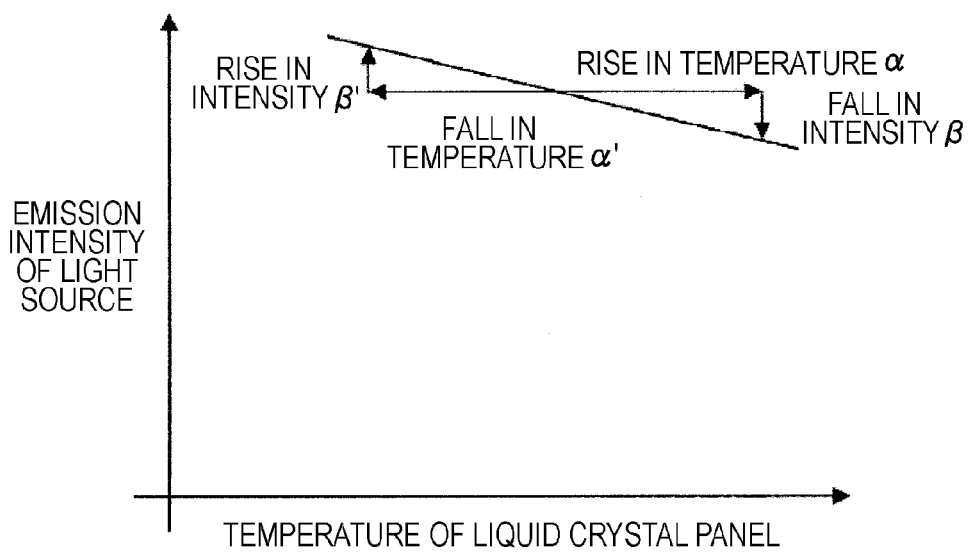
FIG. 12 is a graph showing the relationship between the adjustment of the emission intensity of the light source and the change in temperature of a liquid crystal panel.

FIG. 12 is a graph showing the relationship between the temperature of the liquid crystal panel and the emission intensity of the light source. In this embodiment, since the emission intensity of the light source 500 is controlled as described above. For example, if the temperature of the liquid crystal panel rises (α), the emission intensity of the light source 500 falls (β) by controlling the control circuit 300, as shown in FIG. 12. Further, if the temperature of the liquid crystal panel falls (α'), the emission intensity of the light source 500 rises (β') due to the controlling by the control circuit 300. Therefore, according to this embodiment, it is possible to make the temperature of the liquid crystal panel converge into a stable temperature which is balanced between the temperature of surroundings where the liquid crystal panel is placed and the ability to cool the liquid crystal panel.

According to this embodiment as described above, it is possible to make the temporal alteration in the transmittance constant by adjusting the length of one sub-field even if the response time of the liquid crystal LC changes in response to the temperature. The disadvantages that may occur due to this adjustment are resolved by adjusting the intensity of the light incident on the pixel 50. By performing a two-step adjustment in this way, it is possible to prevent a reversion of the grayscale while displaying a number of grayscales equal to or greater than the number of sub-fields.

2. Applications and Modifications

The invention is not limited to the embodiments described above, but includes various types of applications and modifications in the scope thereof. The applications and modifications included in the invention will be illustrated below.

Figure 13:
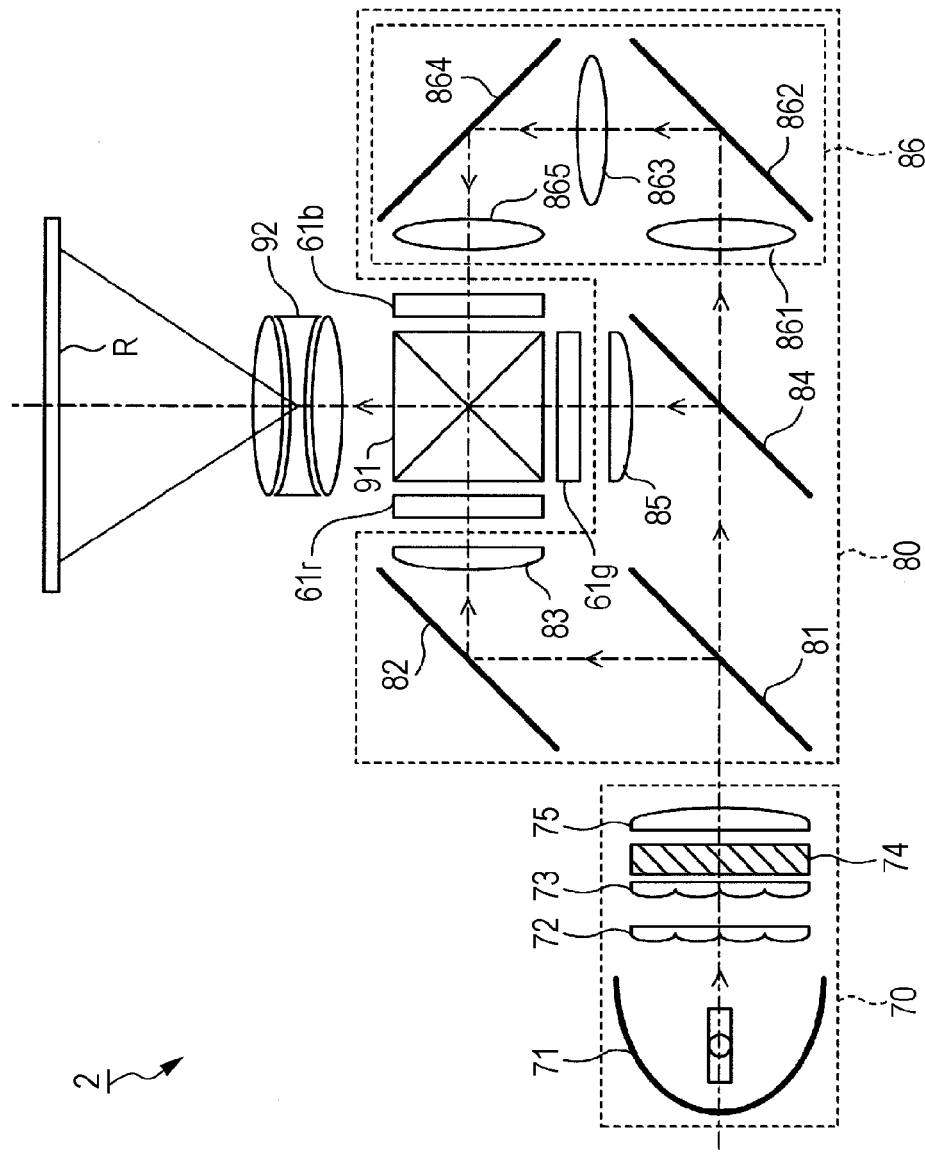
FIG. 13 is a view showing an optical configuration of a projection display according to the first application of the same embodiment.

FIG. 13 is a view showing an optical configuration of a projection display 2 according to the first application of this embodiment. As shown in FIG. 13, the projection display 2 has three liquid crystal panels 61 (61r, 61g, 61b) that correspond to each of the colors of red (R), green (G) and blue (B), an illumination optics 70 that emits light, an optical isolation optics 80 that isolates the emitted light from this illumination optics 70 into each of the color lights of red, green and blue and leads each of them to the liquid crystal panels 61, a dichroic prism 91 that synthesizes the emitted light from each of the liquid crystal panels 61, and a projection lens 92 that projects the emitted light from the dichroic prism 91.

The illumination optics 70 has a light source 71 (for example, a halogen lamp) that emits white light. The emitted light from the light source 71 is converted into a plurality of beams of light by being transmitted into a first lens array 72 and a second lens array 73, each of which are formed of a plurality of lens arranged in a plane, and then reaches a polarization generator 74. This polarization generator 74 is a plate-like member that converts the incident light into any one of s polarization and p polarization and emits it. The emitted light from the polarization generator 74 (polarized light) is transmitted into a lens 75 and is incident on the optical isolation optics 80.

This optical isolation optics 80 is a unit that isolates the emitted light from the illumination optics 70 into red light, green light and blue light. A dichroic mirror 81 reflects the red light and transmits the green light and the blue light. The red light reflected by this dichroic mirror 81 is reflected by a reflector 82, and then transmitted into a field lens 83, and is incident on the liquid crystal panel 61r. On the other hand, a dichroic mirror 84 reflects the green light among the light transmitted into the dichroic mirror 81, and transmits the blue light. The green light reflected by this dichroic mirror 84 is transmitted into a field lens 85, and is incident on the liquid crystal panel 61g. Moreover, the blue light transmitted into a dichroic mirror 84 is incident on the liquid crystal panel 61b via a relay lens system 86. Specifically, this blue light is transmitted into a lens 861 on the incidence side, reflected by a reflector 862, and then transmitted into a relay lens 863. And furthermore, this blue light is reflected by a reflector 864, and then transmitted into a lens 865 on the emission side and is incident on the liquid crystal panel 61b.

The projection display 2 has the same constitution as that of the liquid crystal display 1 of FIG. 1. The light source 71 corresponds to the light source 500, and each of the liquid crystal panels 61 (61r, 61g, 61b) corresponds to the liquid crystal panel in the liquid crystal display 1. Adjustment of the emission intensity of the light source 71 is performed by adjusting the luminance of the light source 71. The emitted light from the three liquid crystal panels 61 is synthesized by a dichroic prism 91, and then is incident on a projection lens 92. The projection lens 92 projects the emitted light from the dichroic prism 91 onto a tabular screen R. In other words, the projection display 2 is one kind of the liquid crystal display performing the grayscale display through light modulation by adjusting the light transmittance of the pixels in each of the liquid crystal panels 61 (61r, 61g, 61b).

Figure 14:
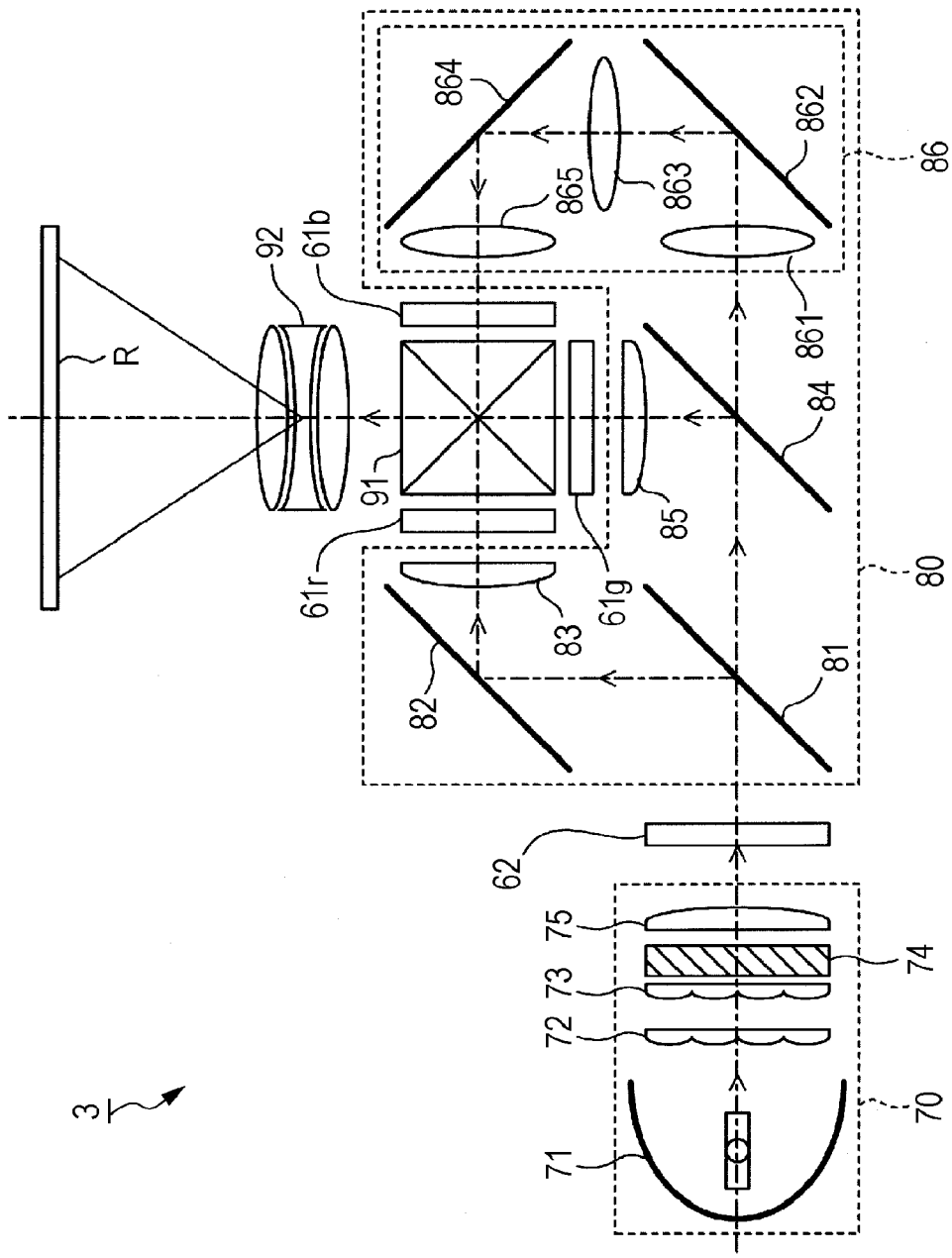
FIG. 14 is a view showing an optical configuration of a projection display according to the second application of the same embodiment.

FIG. 14 is a view showing an optical configuration of a projection display 3 according to the second application of this embodiment. The projection display 3 is obtained by transforming the projection display 2. The difference of the projection display 3 to the projection display 2 is that it includes a liquid crystal panel 62 between the lens 75 of the illumination optics 70 and the dichroic mirror 81 in the optical isolation optics 80. The light emitted from the light source 71 and transmitted into the light lens 75 is incident on the liquid crystal panel 62, and the light transmitted into the liquid crystal panel 62 is incident on the dichroic mirror 81.

In the projection display 3, the control circuit corresponding to the control circuit 300 achieves the same effects as those obtained through the adjustment of the emission intensity of the light source by adjusting not the luminance of the light source 71, but the light transmittance of the liquid crystal panel 62. In addition, a configuration is also possible wherein the projection display 3 is transformed, an iris (aperture) is adopted instead of the liquid crystal panel 62, and the aperture ratio of the iris is adjusted. As is obvious from the above explanation, in the invention, not only the unit that adjusts the emission intensity of the light source, but also any unit that adjusts the intensity (amount of light per unit time) of the light (irradiated light) incident on the liquid crystal panel from the light source may be adopted as the unit that suppresses the grayscale change in the pixel by adjusting the length of the sub-field.

The applications of the embodiment described above are not limited to the projection display 2. For example, a liquid crystal display (for example, HMD (head-mounted display)) provided with backlight as the light source 500 is also one kind of the liquid crystal display performing the grayscale display through light modulation by adjusting the light transmittance of the pixel of the liquid crystal panel, and may be an application of the embodiment described above. EVF (electronic viewfinder) may be exemplified as another application example. Furthermore, it is also possible to be applied to a personal computer, a handheld terminal, or a cellular phone and the like.

A configuration is also possible wherein the embodiment described above is transformed, and a liquid crystal panel having a reflection mode is used in the grayscale display. In this case, the unit that adjusts the intensity of the light incident on the liquid crystal panel may be omitted. Moreover, a configuration is also possible wherein the embodiment described above, the application or the modification are transformed, a measuring unit that measures the intensity of the light incident on the liquid crystal panel is provided, and the intensity of the light incident on the liquid crystal panel is adjusted on the basis of not only the temperature of the liquid crystal panel, but also the intensity measured by this measuring unit. Moreover, the light source may include a plurality of light sources. In this case, a configuration is also possible wherein the adjustment of the emission intensity is not performed with respect to at least one light source among a plurality of the light sources. Moreover, the temperature sensor may include a plurality of temperature sensors. In this case, a configuration is also possible wherein a control circuit adjusts the intensity of the light incident on the liquid crystal panel from the light source on the basis of a statistical value of the temperature measured by a plurality of the temperature sensors.

The entire disclosure of Japanese Patent Application No: 2008-209510, filed Aug. 18, 2008 is expressly incorporated by reference herein.

What is claimed is:

1. A method of driving an electro-optical device including a pixel that has an electro-optical element of which light transmittance changes in response to an applied voltage, and response time, for which the light transmittance changes to a predetermined value after the voltage is applied, changes in response to the temperature, comprising:

Providing a predetermined number of sub-fields having the same length in one frame, and supplying either an on-voltage indicating light-on or an off-voltage indicating light-off to the pixel in each of the predetermined number of the sub-fields in response to the grayscale to be displayed;

controlling of the length of one sub-field so that the ratio of the response time to the length of the one sub-field is constant in response to the temperature of the pixel; and controlling, based on the measured temperature, when a residual period is defined as a period in which the predetermined number of the sub-fields are removed from one frame, the intensity of the light incident on the pixel in compensation for the length of the residual period that changes due to the temperature of the pixel so that the grayscale to be displayed is constant.

2. An electro-optical device, comprising:

a pixel that has an electro-optical element of which light transmittance changes in response to an applied voltage, and response time, for which the light transmittance changes to a predetermined value after the voltage is applied, changes in response to the temperature;

a light source that irradiates light to the pixel;

a driving unit that includes a predetermined number of sub-fields having the same length in one frame, and that provides either an on-voltage indicating light-on or an off-voltage indicating light-off to the pixel in each of the predetermined number of the sub-fields in response to the grayscale to be displayed;

a temperature measuring unit that measures the temperature and outputs a temperature signal;

a time controlling unit that controls the length of one sub-field on the basis of the temperature signal; and a light intensity controlling unit that controls the intensity of the light incident on the pixel on the basis of the temperature signal.

3. The electro-optical device according to claim 2, wherein the time controlling unit controls the length of the one sub-field on the basis of the temperature signal so that the ratio of the response time to the length of the one sub-field is constant even if the temperature changes.

4. The electro-optical device according to claim 2, wherein, when a residual period is defined as the period in which the predetermined number of the sub-fields are removed from one frame, the light intensity controlling unit controls the intensity of the light incident on the pixel on the basis of the temperature signal in compensation for the length of the residual period that changes due to the temperature so that the grayscale to be displayed is constant.

5. The electro-optical device according to claim 2, wherein the light source controls the intensity of the light irradiated on the basis of a control signal, and wherein the light intensity controlling unit provides the control signal generated on the basis of the temperature signal to the light source.

6. The electro-optical device according to claims 2, wherein the light intensity controlling unit includes:

an adjusting unit that is disposed between the light source and the pixel, and that adjusts the intensity of the light irradiated by the light source in response to the magnitude of the control signal and outputs it to the pixel; and a controlling unit that controls the magnitude of the control signal provided to the adjusting unit on the basis of the temperature signal.

7. An electronic apparatus comprising the electro-optical device according to claim 2.

* * * * *